(12) United States Patent
Yadmellat et al.

(10) Patent No.: US 11,181,921 B2
(45) Date of Patent: Nov. 23, 2021

(54) SYSTEM AND METHOD FOR HIERARCHICAL PLANNING IN AUTONOMOUS VEHICLES

(71) Applicants: Peyman Yadmellat, North York (CA); Seyed Masoud Nosrati, Markham (CA); Elmira Amirloo Abolfathi, North York (CA); Mohammed Elmahgiubi, Richmond Hill (CA); Yunfei Zhang, Aurora (CA); Jun Luo, Toronto (CA)

(72) Inventors: Peyman Yadmellat, North York (CA); Seyed Masoud Nosrati, Markham (CA); Elmira Amirloo Abolfathi, North York (CA); Mohammed Elmahgiubi, Richmond Hill (CA); Yunfei Zhang, Aurora (CA); Jun Luo, Toronto (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 234 days.

(21) Appl. No.: 16/288,771

(22) Filed: Feb. 28, 2019

(65) Prior Publication Data
US 2020/0089245 A1 Mar. 19, 2020

Related U.S. Application Data

(60) Provisional application No. 62/731,421, filed on Sep. 14, 2018.

(51) Int. Cl.
*G05D 1/02* (2020.01)
*G05D 1/00* (2006.01)
*G06N 20/20* (2019.01)

(52) U.S. Cl.
CPC ......... *G05D 1/0221* (2013.01); *G05D 1/0088* (2013.01); *G06N 20/20* (2019.01); *G05D 2201/0212* (2013.01)

(58) Field of Classification Search
CPC .................................................... G05D 1/0221
See application file for complete search history.

(56) References Cited

U.S. PATENT DOCUMENTS 9,964,952 B1  5/2018 Costa et al.
2016/0129907 A1  5/2016 Kim et al.
(Continued)

FOREIGN PATENT DOCUMENTS

CN  105549597 A  5/2016
CN  105599764 A  5/2016
(Continued)

OTHER PUBLICATIONS

Wenda Xu et al.,"A Vehicle Model for Micro-Traffic Simulation in Dynamic Urban Scenarios",2011 IEEE International Conference on Robotics and Automation,Shanghai International Conference Center, May 9-13, 2011, Shanghai, China, total:8pages.

*Primary Examiner* — Thomas G Black
*Assistant Examiner* — Tarek Elarabi

(57) ABSTRACT

A method and system for determining a trajectory within an operating space for an autonomous vehicle to implement a behaviour decision, comprising: generating a set of candidate target end states for the behaviour decision based on an estimated state of the vehicle; generating a set of candidate trajectories corresponding to the set of candidate target end states based on the estimated state of the vehicle; determining a suitability of each of the candidate target end states based on the estimated state of the vehicle; and selecting a trajectory to implement the behaviour decision from the set
(Continued)

of candidate trajectories based on the determined suitability of the candidate target end states.

20 Claims, 9 Drawing Sheets

(56) References Cited

U.S. PATENT DOCUMENTS

| | | | | |
|---|---|---|---|---|
| 2017/0277194 A1* | 9/2017 | Frazzoli | ............ | B60W 60/0015 |
| 2018/0143630 A1* | 5/2018 | Rohani | .............. | G01C 21/3446 |
| 2018/0247160 A1 | 8/2018 | Rohani et al. | | |
| 2019/0271986 A1* | 9/2019 | Yamada | ................ | B60W 30/10 |
| 2019/0392242 A1* | 12/2019 | Tariq | .................. | G06K 9/00805 |

FOREIGN PATENT DOCUMENTS

| | | |
|---|---|---|
| CN | 107702716 A | 2/2018 |
| WO | 2018090661 A1 | 5/2018 |

* cited by examiner

SYSTEM AND METHOD FOR HIERARCHICAL PLANNING IN AUTONOMOUS VEHICLES

CROSS-REFERENCE TO RELATED APPLICATIONS

The present disclosure claims priority from U.S. provisional patent application No. 62/731,421, filed Sep. 14, 2018, entitled "SYSTEM AND METHOD FOR HIERARCHICAL PLANNING IN AUTONOMOUS VEHICLES", the entirety of which is hereby incorporated by reference.

FIELD

The present disclosure relates to systems and methods for hierarchical planning for autonomous vehicles.

BACKGROUND

An autonomous vehicle may use different sensors to sense its surrounding environment and vehicle operating parameters, a state estimation system to determine a state of the vehicle based on the sensed environment and vehicle operating parameters, a planning system to plan future vehicle actions based on target objectives and the vehicle state, a vehicle control system for translating the planned future action into control commands, and an electromechanical system for implementing the control commands. Of these systems, the planning system plays a crucial role in decision making, planning, and navigation.

The planning system conventionally consists of a behavioral planner (BP) and a motion planner (MoP). Motion planning in autonomous ground, aerial, surface, and underwater vehicles is typically done by choosing a trajectory based on state information for a controller to follow. Standard approaches use explicit cost functions as rules for ranking candidate trajectories for selection. When the environment or interaction is too complex, a BP that relies on predefined rules may be used to make higher level decisions that constrain motion planning or narrow down its scope. Because the predefined rules and explicit cost functions are very hard to tune and debug, standard BP plus MoP solutions can lack scalability for complex dynamic scenarios, such as autonomous driving on busy urban streets. This limitation leads to highly conservative driving policies and behaviors, severely restricting the ability of autonomous vehicles.

In an ideal case, a fully autonomous vehicle will have the ability to form sophisticated driving plans to handle a dynamic and complex environment while maintaining strict safety assurance. For a better generalizability and to handle more complex and rare scenarios, many recent studies are focusing on machine learning based approaches, such as flat supervised learning or reinforcement leaning, or option-based hierarchical reinforcement learning (HRL) methods. However, these efforts, while in principle more promising in terms of scaling for context complex scenarios, are yet to become effective and practical.

There is a need for a planning solution for autonomous vehicles that is modular, extensible, practical, and scalable through machine learning.

SUMMARY

According to example aspects, the present disclosure provides methods and system for hierarchical planning in autonomous vehicles.

According to a first example aspect is a method and system for determining a trajectory within an operating space for an autonomous vehicle, comprising: generating a set of target end states for the behaviour decision based on an estimated state of the vehicle; generating a set of candidate trajectories corresponding to the set of target end states based on the estimated state of the vehicle; determining a suitability of the target end states included in the set of target end states based on the estimated state of the vehicle; and selecting a trajectory to implement the behaviour decision from the set of candidate trajectories based on the suitability of the target end states.

In some aspects, the present disclosure describes a method for determining a trajectory within an operating space for an autonomous vehicle, the method including: generating a set of candidate target end states for a behaviour decision based on an estimated state of the vehicle, the estimated state of the vehicle including one or more of: information about vehicle position, an environment of the vehicle, or one or more kinodynamic parameters of the vehicle; generating a set of candidate trajectories corresponding to the set of candidate target end states based on the estimated state of the vehicle; determining a suitability of each of the candidate target end states based on the estimated state of the vehicle; and selecting a trajectory to implement the behaviour decision from the set of candidate trajectories based on the determined suitability of the candidate target end states.

In any of the above, selecting a trajectory may be further based on properties of the candidate trajectories.

In any of the above, generating the set of candidate trajectories may include generating a subset of trajectory properties for each of the candidate trajectories, and the method may further include, after the selecting, generating a full set of trajectory properties for the selected trajectory.

In any of the above, generating the set of candidate trajectories may include generating at least one candidate trajectory for each of the candidate target end states.

In any of the above, generating the set of candidate trajectories may include generating, for at least one candidate target end state, two or more candidate trajectories, wherein the two or more candidate trajectories may be generated using different trajectory generator functions.

In any of the above, generating the set of target end states may include selecting a target end state generator function from a plurality of target end state generator functions based on a type of the behaviour decision, and using the selected target end state generator function to generate the set of target end states.

In any of the above, the plurality of target end state generator functions may include a learning-based function or a rule-based function.

In any of the above, at least one of the plurality of target end state generator functions may be configured to apply a discretization to the operating space of the autonomous vehicle.

In any of the above, the at least one of the plurality of target end state generator functions may be configured to apply a linear grid discretization, a linear region discretization, or a non-uniform grid discretization.

In any of the above, generating the set of candidate trajectories may include selecting a trajectory generator function from a plurality of trajectory generator functions based on the type of the behaviour decision, and using the selected trajectory generator function to generate at least one of the candidate trajectories.

In some aspects, the present disclosure describes a system for determining a trajectory within an operating space for an autonomous vehicle, the system including a processing unit configured to execute instructions to implement: a target state generator configured to generate a set of candidate target end states for a behaviour decision based on an estimated state of the vehicle, the estimated state of the vehicle including one or more of: a location of the vehicle, an environment of the vehicle, or one or more kinodynamic parameters of the vehicle; a candidate trajectory generator configured to generate a set of candidate trajectories corresponding to the set of candidate target end states based on the estimated state of the vehicle; a target state evaluator configured to determine a suitability of each of the candidate target end states based on the estimated state of the vehicle; and a trajectory selector configured to select a trajectory to implement the behaviour decision from the set of candidate trajectories based on the determined suitability of the candidate target end states.

In any of the above, the trajectory selector may be further configured to select a trajectory based on properties of the candidate trajectories.

In any of the above, the candidate trajectory generator may be further configured to generate the set of candidate trajectories by generating a subset of trajectory properties for each of the candidate trajectories, and may be further configured to generate a full set of trajectory properties for the selected trajectory.

In any of the above, the candidate trajectory generator may be further configured to generate the set of candidate trajectories by generating at least one candidate trajectory for each of the candidate target end states.

In any of the above, the candidate trajectory generator may be further configured to generate the set of candidate trajectories by generating, for at least one candidate target end state, two or more candidate trajectories, wherein the two or more candidate trajectories may be generated using different trajectory generator functions.

In any of the above, the target state generator may be further configured to generate the set of target end states by selecting a target end state generator function from a plurality of target end state generator functions based on a type of the behaviour decision, and using the selected target end state generator function to generate the set of target end states.

In any of the above, at least one of the plurality of target end state generator functions may be configured to apply a discretization to the operating space of the autonomous vehicle.

In any of the above, the at least one of the plurality of target end state generator functions may be configured to apply a linear grid discretization, a linear region discretization, or a non-uniform grid discretization.

In any of the above, the candidate trajectory generator may be further configured to generate the set of candidate trajectories by selecting a trajectory generator function from a plurality of trajectory generator functions based on the type of the behaviour decision, and using the selected trajectory generator function to generate at least one of the candidate trajectories.

In some aspects, the present disclosure describes a non-transitory computer-readable medium storing instructions, which when executed by a processor of an autonomous vehicle, cause the autonomous vehicle to: generate a set of candidate target end states for a behaviour decision based on an estimated state of the vehicle, the estimated state of the vehicle including one or more of: information about vehicle position, an environment of the vehicle, or one or more kinodynamic parameters of the vehicle; generate a set of candidate trajectories corresponding to the set of candidate target end states based on the estimated state of the vehicle; determine a suitability of each of the candidate target end states based on the estimated state of the vehicle; and select a trajectory to implement the behaviour decision from the set of candidate trajectories based on the determined suitability of the candidate target end states.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Some examples of the present disclosure are described in the context of autonomous vehicles. Although examples described herein may refer to a car as the autonomous vehicle, the teachings of the present disclosure may be implemented in other forms of autonomous or semi-autonomous vehicles including, for example, trams, subways, trucks, buses, surface and submersible watercraft and ships, aircraft, drones (also called unmanned aerial vehicles (UAVs)), warehouse equipment, manufacturing facility equipment, construction equipment, farm equipment, autonomous service robots such as vacuum cleaners and lawn mowers, and other robotic devices. Autonomous vehicles may include vehicles that do not carry passengers as well as vehicles that do carry passengers.

Figure 1:
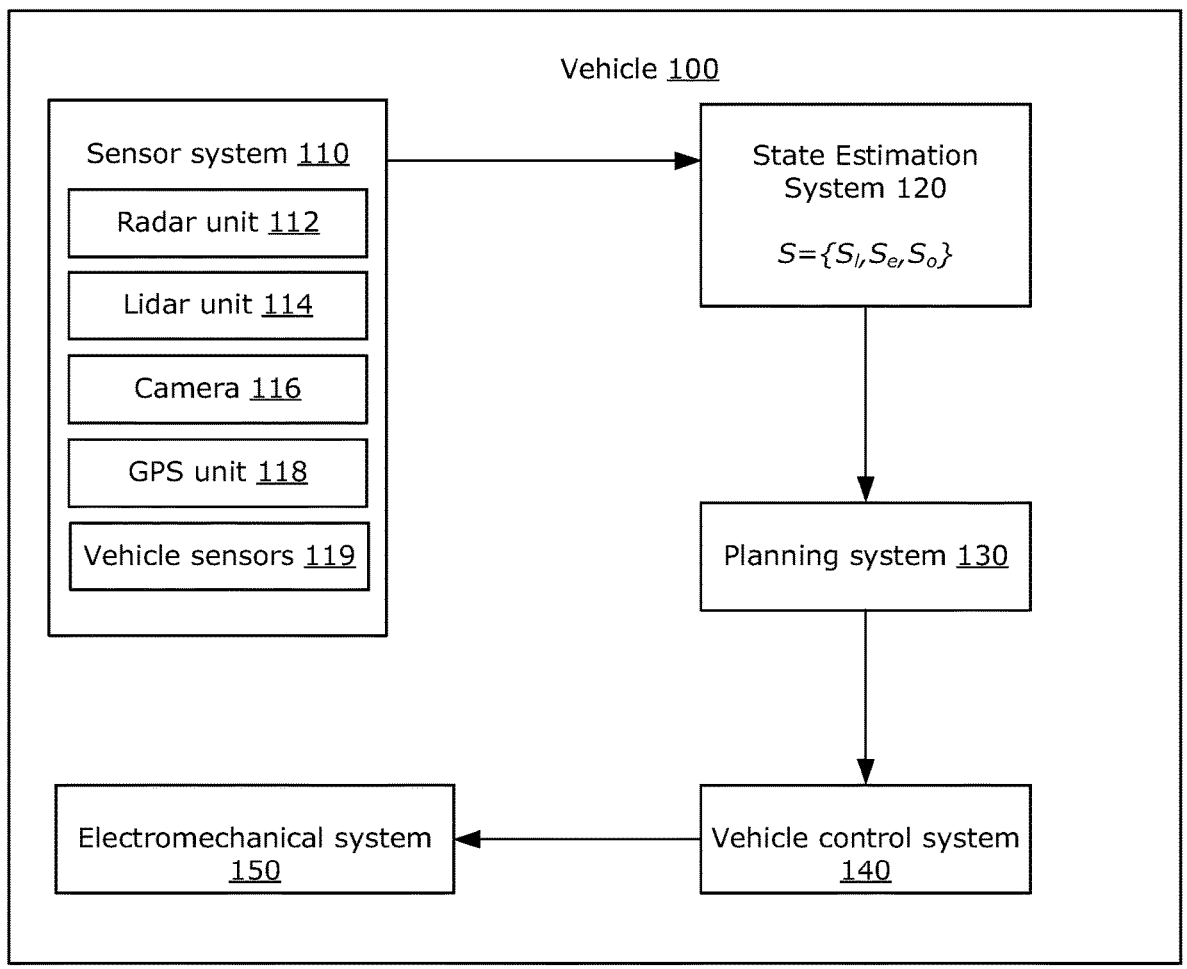
FIG. 1 is a block diagram illustrating some components of an example autonomous vehicle.

FIG. 1 is a block diagram illustrating certain components of an example autonomous vehicle 100. Although described as being autonomous, the vehicle 100 may be operable in a fully-autonomous, semi-autonomous or fully user-controlled mode. In the present disclosure, the vehicle 100 is described in the embodiment of a car, however the present disclosure may be implemented in other vehicular devices, as discussed above.

The vehicle 100 includes a sensor system 110, a state estimation system 120, a planning system 130, a vehicle control system 140 and an electromechanical system 150, for example. Other systems and components may be included in the vehicle 100 as appropriate. The state estimation system 120, the planning system 130, and the vehicle control system 1430 in this example are distinct software systems that may be implemented on one or more chips (e.g., application-specific integrated circuit (ASIC), field-programmable gate array (FGPA), and/or other types of chip). For example, the state estimation system 120, the planning system 130, and the vehicle control system 140 may be implemented using one chip, two chips, or three distinct chips (using the same or different types of chips). Various systems and components of the vehicle may communicate with each other, for example through wired or wireless communication. For example, the sensor system 110 may communicate with the state calculation system 120, the planning system 130 and the vehicle control system 140; state estimation system 120 may communicate with the planning system 130 and the vehicle control system 140; the planning system 130 may communicate with the vehicle control system 140; and the vehicle control system 140 may communicate with the electromechanical system 150. FIG. 1 illustrates an example flow of data (indicated by arrows) from the sensor system 110 to the state estimation system 120, to the planning system 130, to the vehicle control system 140, and finally to the electromechanical system 150 (discussed in further detail below). However, it should be understood that data may be communicated among the systems 110, 120, 130, 140, 150 in various different ways, and there may be two-way data communication among the systems 110, 120, 130, 140, 150.

Figure 3:
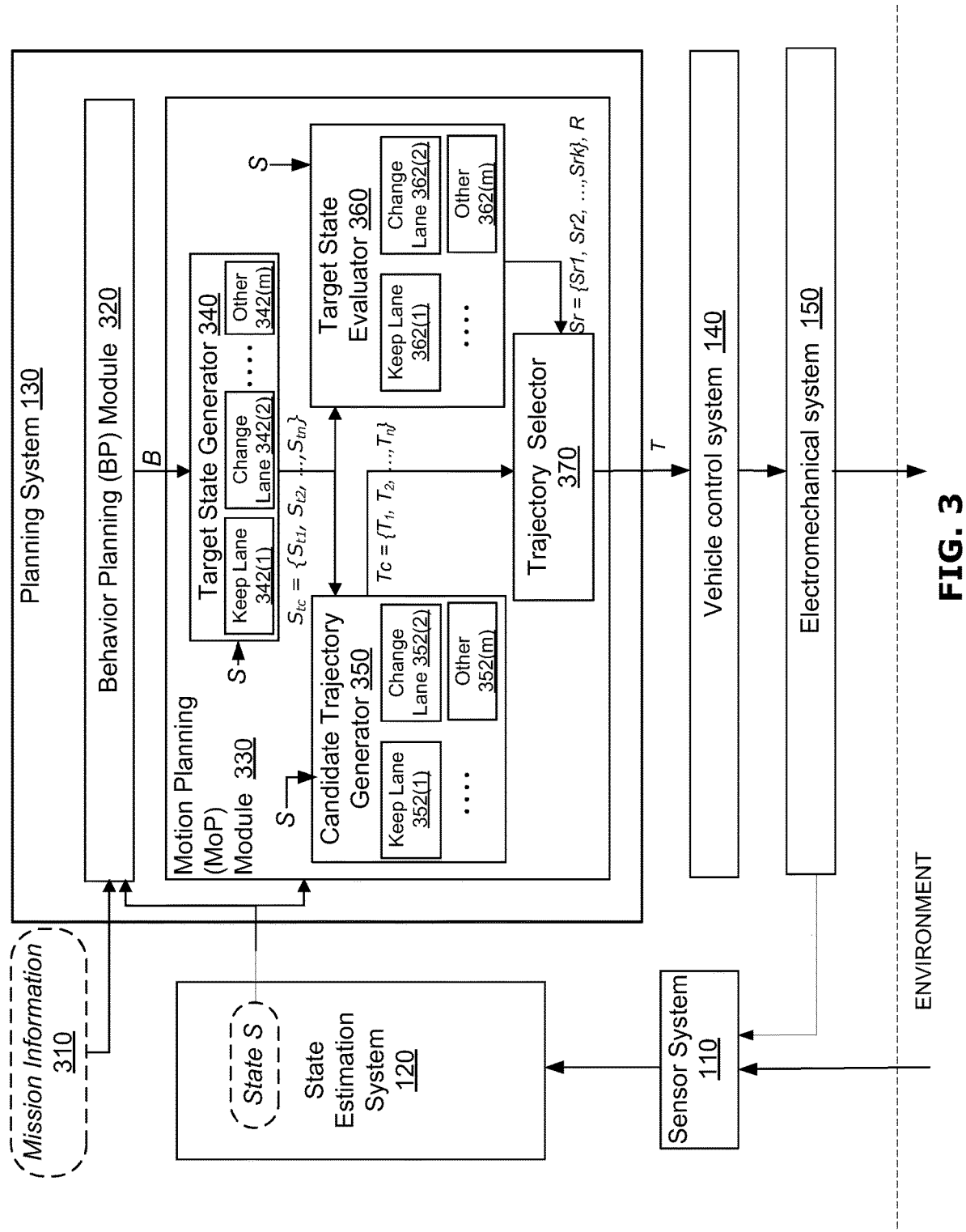
FIG. 3 is a block diagram showing logical components of a planning system according to an example embodiment.

The sensor system 110 includes various sensing units for collecting information about an environment the vehicle 100 operates in. The information collected by the sensor system 100 is provided as sensor data to the state estimation system 120 to enable the state estimation system 102 to generate an estimated state of the vehicle (referred to hereinafter as estimated vehicle state S, as shown in FIG. 3) which is an estimate of a current state of the vehicle. In example embodiments, the estimated vehicle state S includes information including a vehicle location state ($S_l$), a vehicle environment state ($S_e$), and a vehicle operational state ($S_o$). Vehicle location state $S_l$ describes a position of the vehicle and may for example include absolute geographical longitude/latitudinal values and/or values that reference other frames of reference. Vehicle environment state $S_e$ describes the surrounding environment of the vehicle, including for example stationary and moving objects around the vehicle, weather and temperature conditions, road conditions, road configuration and other information about the physical environment that the vehicle operates in. Vehicle operational state $S_o$ describes physical operating conditions of the vehicle itself, including for example kinodynamic parameters such as linear speed and acceleration, travel direction, angular acceleration, pose (e.g. pitch, yaw, roll), and vibration, and mechanical system operating parameters such as engine RPM, throttle position, brake position, and transmission gear ratio, among other things. Generally, the term kinodynamics relates to a class of problems, in robotics and motion planning, in which velocity, acceleration, force/torque bounds must be satisfied and where kinematics constraints (e.g., obstacle avoidance) must also be satisfied. Kinodynamic parameters are those parameters, such as described above, that are relevant to this type of motion planning problem.

In this regard, the vehicle sensor system 110 may for example include radar unit 112, a LIDAR unit 114, a camera 116, a global positioning system (GPS) unit 118, and vehicle sensors 119. Vehicle sensors 119 may include sensors for collecting information about the physical operating conditions of the vehicle 100, including for example sensors for sensing steering angle, linear speed, linear and angular acceleration, pose (pitch, yaw, roll), compass travel direction, vehicle vibration, throttle state, brake state, wheel traction, transmission gear ratio, cabin temperature and pressure, as well as external environment sensors for sensing things such as an external temperature and pressure, precipitation, and noise, among other possibilities. Vehicle sensors 119 provide the collected information as sensor data to the state estimation system 120.

The state estimation system 120 receives sensor data from the sensor system 110 and uses the sensor data to generate the estimated vehicle state $S=\{S_l, S_e, S_o\}$, which as noted above includes a vehicle location state, vehicle environment state, and vehicle operational state. For example, sensor data from the radar, LIDAR and camera units 112, 114, 116 and other sensors may be used to determine the local environment of the vehicle 100 (e.g., any immediately surrounding obstacles) as well as information from a wider vicinity (e.g., the radar unit 112 and LIDAR unit 114 may collect information from an area of up to 100 m radius or more around the vehicle 100). Sensor data from GPS unit 118 and other sensors may be used to determine vehicle location state, defining a geographic position of the vehicle 100. Sensor data from vehicle sensors 119 and GPS unit 118, as well as from other sensor units, may be used to determine vehicle operational state $S_o$, including speed and pose of the vehicle 100 relative to a frame of reference.

The state estimation system 120 may be implemented using software that is executed on one or more dedicated processing units or one or more general processing units of the vehicle 100. State estimation system 120 may include any number of independent or interconnected modules or functions, and may for example include rules-based modules, machine learning based modules, and combinations thereof. Machine learning based modules may be implemented using neural networks, such a convolution neural networks or deep neural networks. Machine learning based modules may be built (e.g. generated) using machine learning algorithms and sample data (otherwise known as training data) comprising data samples indicative of states of the vehicle 100. Examples of different machine learning algorithms that may be used to build the machine learning based modules include supervised learning algorithms, imitation learning algorithms, deep reinforcement learning algorithms such as value-based, policy gradient, and model based algorithms. The state estimation system 120 may repeatedly (e.g., in regular intervals) receive sensor data from the sensor system 110 and perform analysis in real-time during vehicle operation. In some examples, state estimation system 120 can include a fusion module for fusing data from the multiple sensors of sensor system 110; a perception module for detection and identification of objects in environment of the vehicle 100 (for example to detect and identify a stationary obstacle, or a pedestrian or another vehicle, lanes and lane boundaries, and traffic lights/signs, among other things); and localization and mapping modules for estimating vehicle position.

Estimated vehicle state S={$S_l$, $S_e S_o$} output from the state estimation system 120 based on sensor data received from the sensor system 110 is provided in real-time to the planning system 130, which is the focus of the current disclosure and will be described in greater detail below. The vehicle control system 140 serves to control operation of the vehicle 100 based on target objectives set by the planning system 130. The vehicle control system 140 may be used to provide full, partial or assistive control of the vehicle 100. The electromechanical system 150 receives control signals from the vehicle control system 140 to operate the electromechanical components of the vehicle 100 such as an engine, transmission, steering system and braking system.

Figure 2:
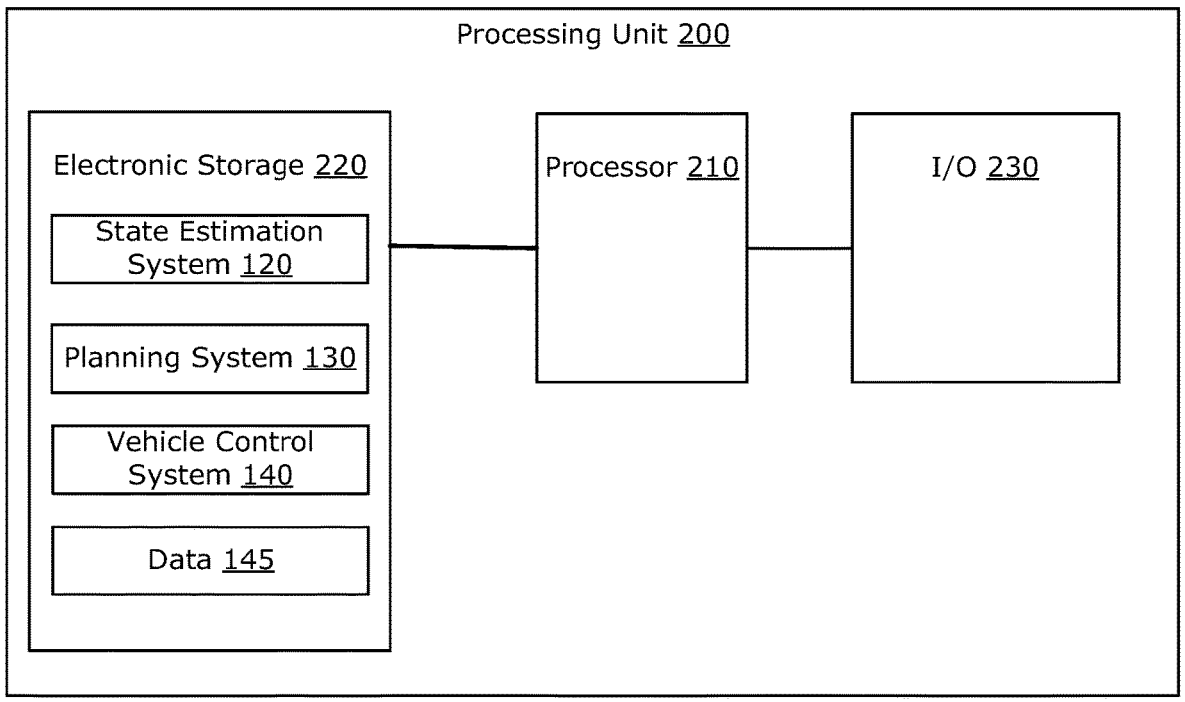
FIG. 2 is block diagram illustrating some components of a processing unit used to implement a planning system of the autonomous vehicle of FIG. 1 according to example embodiments.

The state estimation system 120, planning system 130 and the vehicle control system 140 may be implemented, at least in part, in one or more processing units of the vehicle 100. By way of example, FIG. 2 shows illustrates an example of a processing unit 200 of vehicle 100 that includes one or more physical processors 210 (e.g., a microprocessor, graphical processing unit, tensor processing unit, digital signal processor or other computational element) coupled to electronic storage 220 and to one or more input and output interfaces or devices 230. The electronic storage 220 can include non-transient or tangible memory (for example flash memory) and transient memory (for example RAM). The tangible memory(ies) may store instructions, data and/or software modules for execution by the processor(s) 210 to carry out the functions of the systems described herein. The tangible memory(ies) of electronic storage 220 may store other software instructions and data for implementing other operations of the vehicle 100. Electronic storage 220 may include any suitable volatile and/or non-volatile storage and retrieval device(s), including for example flash memory, random access memory (RAM), read only memory (ROM), hard disk, optical disc, subscriber identity module (SIM) card, memory stick, secure digital (SD) memory card, and other state storage devices. In the example of FIG. 2, the electronic storage 220 of processing unit 200 stores the instructions of the state estimation system 120, the planning system 130, and the vehicle control system 140, respectively, which are executable by the processor 210. The electronic storage 220 also stores data 145, including sensor data provided by the sensor system 110 and data utilized by the planning system 130 to generate a driving plan.

FIG. 3 is a block diagram representation of a logical architecture of planning system 130 and its interaction with other vehicle systems, according to example embodiments. According to example embodiments, the planning system 130 is configured as a scalable, modular and extensible machine learning-based system for autonomous vehicles. The planning system 130 may for example include, among other modules, a mission planning module (not shown), a behavior planning (BP) module 320 and a motion planning (MoP) module 330. The present disclosure focuses on BP module 320 and MoP module 330 of the planning system 130.

Autonomous navigation for cars from point A to point B may include many driving sub-tasks and conditions that require different considerations such as: conformance to traffic rules; navigation in structured and unstructured roads; navigation in different types of roads; handling dynamic and static obstacles; dealing with different weather conditions, and so on. These myriad tasks and considerations can make it difficult to design an end-to-end planning system that generates a driving plan that deals with all types of scenarios, environments, and conditions. To this end, in example embodiments, planning system 130 is configured to provide a modular and extensible system that can deal with different driving sub-tasks and conditions, and is enabled to abstract road and driving area complexities to a more general state-action representation.

In the example of FIG. 3, BP module 320 is configured to output a vehicle behavior decision B based on inputs that include mission information 310 and estimated vehicle state S. The mission information 310 (which may for example be received from a mission planning module) includes information that specifies (or which can be used to deduce) a target objective for the vehicle, for example "proceed to a target Point 'Y' within a target time 'X'". This target objective may be a sub-objective of a larger end objective, or may itself be an end objective. BP module 320 particularizes the target objective into an ongoing succession of vehicle behavior decisions required to achieve the target objective. The determination of each vehicle behavior decision B is based on the estimated vehicle state S as estimated by the state estimation system 120. The estimated vehicle state S is estimated by the state estimation system 120 based on sensor data received from the sensor system 110. The sensor system 110 makes real-time measurements and collects information about the current environment the vehicle 100 operates in and the physical operating conditions of the vehicle 100, and provides sensor data to the state estimation system 120. By way of non-limiting example, in order to achieve a target objective based on estimated vehicle state S, vehicle behavior decision B may be selected from the following possible behaviors: Keep Lane; Change Lane—Left; Change Lane—Right; Proceed Around Obstacle; Proceed in Open Area; Park; Pull-over and Stop at Roadside; etc.

In some example embodiments, BP module 320 may be implemented using a rules-based architecture. In some example embodiments, BP module 320 may be a machine learning based module implemented using machine learning modules. Each machine learning based module may be implemented using one or more neural networks, such as convolution neural networks or deep neural networks. Each machine learning based module may be built (e.g. generated) using machine learning algorithms and sample data (otherwise known as training data) comprising data samples indicative of behavior decisions B, and may be trained (e.g., using the sample data) to a suitable level of performance. For example, each machine learning based module may be implemented using a neural network and may be trained using sample data by adjusting weights or parameters of the neural network until a loss function for the neural network is optimized. Examples of different machine learning algorithms that may be used to build the machine learning based modules include supervised learning algorithms, imitation learning algorithms, deep reinforcement learning algorithms such as value-based, policy gradient, and model based algorithms, among others.

As shown in FIG. 3, MoP Module 330 is configured to output a selected trajectory T based on an input behavior decision B and estimated vehicle state S. In particular, MoP Module 330 plans and outputs the selected trajectory T required to implement the behavior decision B in view of the estimated vehicle state S. The selected trajectory T is then used by the vehicle control system 140 to control vehicle operation to implement the behavior, resulting in a new vehicle state, for which a new estimated state S is generated (using new sensed data) and fed back to the planning system 130.

Figure 4:
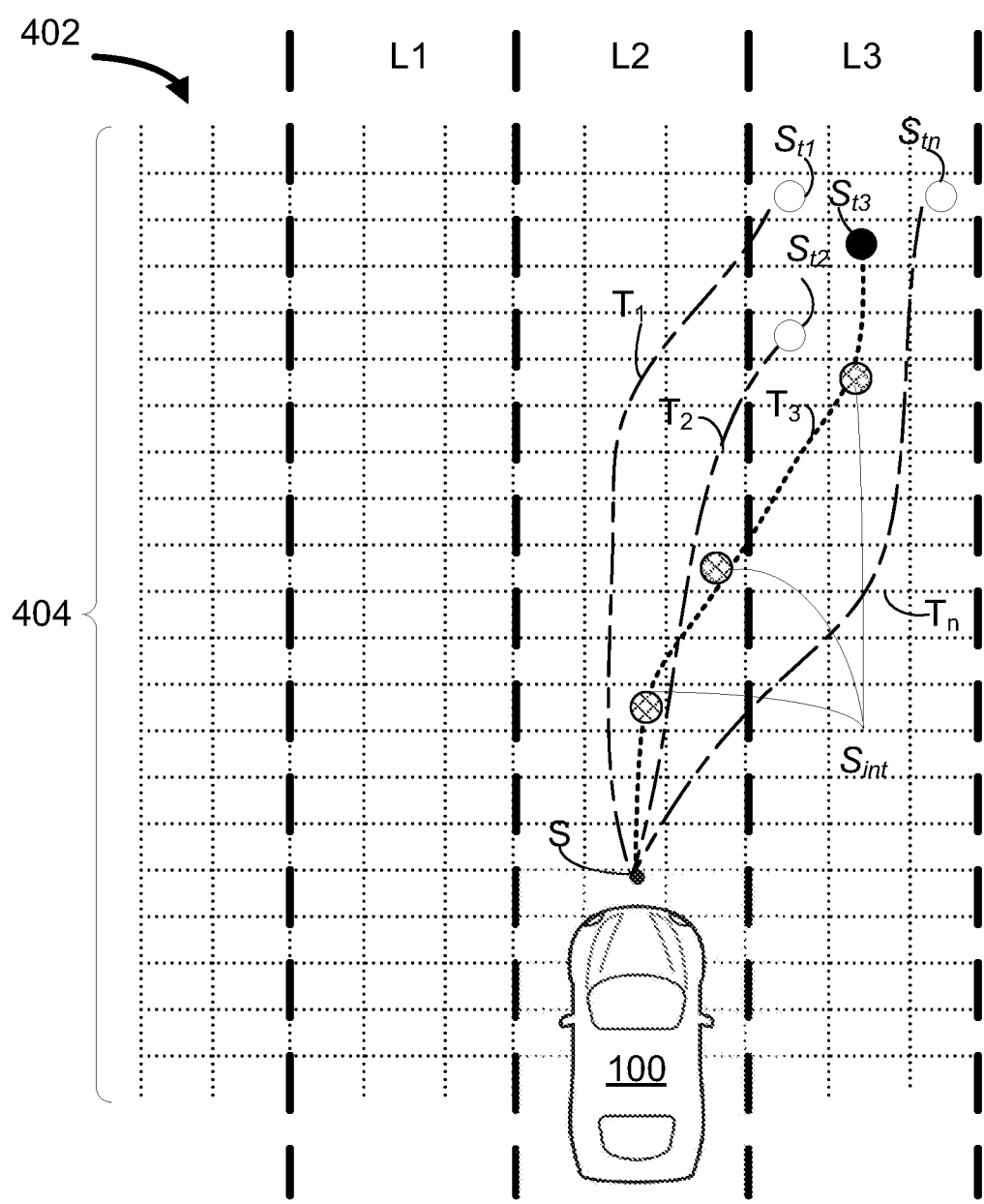
FIG. 4 is a plan view showing a first example of an autonomous vehicle within an operating space, illustrating multiple candidate trajectories and candidate target states for a change lane behavior.

As indicated in FIG. 3, in example embodiments, the MoP module 330 includes four sub-modules, namely a target state generator 340, a candidate trajectory generator 350, a target state evaluator 360 and a trajectory selector 370. Target state generator 340 is configured to generate a set of candidate target end states $S_{tc}=\{S_{t1}, S_{t2}, \ldots, S_{tm}\}$ for the behavior decision B. Each target end state $S_{ti}$ specifies an end target position (e.g. where the vehicle should be located once the behavior decision B is implemented), one or more end target kinodynamic parameters such as vehicle speed, acceleration and pose (e.g. what the vehicle's kinodynamic parameters should be once behavior decision B is implemented), and in some examples, target time constraints. By way of example, FIG. 4 shows a plan view of a vehicle to illustrate a motion planning example in respect of the behavior decision B="Change Lane-Right", illustrating a set of candidate target states $S_{tc}=\{S_{t1}, S_{t2}, \ldots, S_{tm}\}$ that have been determined by target state set evaluator 360 based on current estimated vehicle state S. As illustrated in FIG. 4, in example embodiments the vehicle operational space 402 (e.g., a three dimensional space in the environment in which the vehicle 100 operates in) is discretized into a grid 404 in Cartesian space. In such embodiments, the end target vehicle position may be specified as a point in or cell of the grid (it will be appreciated that multiple target states $S_{ti}$ could share the same location in space 402, but have different kinodynamic parameters). In some examples, the end target vehicle position may be specified as a region or zone—for example, in FIG. 4 each of the three lanes L1, L2 and L3 of the vehicle operational space 402 could be defined as respective regions, and the end target vehicle position specified as "lane L3".

In some example embodiments, the target state generator 340 is configured to generate one or more intermediate target states $S_{int}$ in association with each one of generated end target states $S_{ti}$. Each intermediate state $S_{int}$ defines an intermediate target state between the current estimated vehicle state S and its associated end target state $S_{ti}$, and may for example specify one or both of an intermediate target position and intermediate target kinodynamic parameters. By way of illustration, a plurality of intermediate target states $S_{int}$ generated in association with target state $S_{t3}$ are illustrated in FIG. 4.

In example embodiments, target state set generator 340 generates candidate end target states $S_{tc}=\{S_{t1}, S_{t2}, \ldots, S_{tm}\}$ (and, if applicable, intermediate target states $S_{int}$) using one or more functions. The functions may include rules-based functions (e.g. functions implemented using rules) or machine learning based functions (e.g. functions that are learned using machine learning algorithms and sample data (e.g., data samples indicative of target states), including supervise learning algorithms, imitation learning algorithms, and or deep reinforcement learning algorithms such as value-based, policy gradient, model-based algorithms). In some examples, a combination of rules-based functions and machine learning based functions may be used for target state generator 340. In some examples, the target state generator 340 includes a set of functions 342(1), 342(2) ... 342(m), each one of which is optimally configured to determine target states for a specific class or type of behavior B. By way of example, in the embodiment of FIG. 3, function 342(1) is specifically configured for determining candidate target states $S_{tc}=\{S_{t1}, S_{t2}, \ldots, S_{tm}\}$ when the behavior decision input is B="keep lane", and function 342(2) is specifically configured for determining candidate target states $S_{tc}=\{S_{t1}, S_{t2}, \ldots, S_{tm}\}$ when behavior decision input B is a "change lane" type. In the example of FIG. 3, the same functions may be used for opposite but symmetrical behaviors—for example, a single "change lane" function is used for both a "change lane-right" or "change lane-left" behavior decision input, with direction-dependent values of the candidate target states $S_{tc}=\{S_{t1}, S_{t2}, \ldots, S_{tm}\}$ being symmetrically reversed based on the direction specified in the input behaviour decision B output. However, in different embodiments, different functions may be used for opposite but symmetrical behaviors.

Accordingly, in example embodiments, the target state generator 340 is configured to select a specific candidate target state generator function 342(i) from the set of pre-specified candidate target state generator functions 342(1) to 342(m) based on the behavior decision B. In some examples, at least some of the target state generator functions 342(1) to 342(m) are machine learning based functions (e.g. functions that are learned using machine learning algorithms and sample data (e.g., data samples indicative of target states), including supervise learning algorithms, imitation learning algorithms, or methods such as deep learning, and or deep reinforcement learning algorithms such as value-based, policy gradient, model-based algorithms). Machine learning based functions are functions that have been trained to a suitable level of performance using loss functions defined for the specific class or type of behavior that the function will be used to determine candidate target states $S_{tc}=\{S_{t1}, S_{t2}, \ldots, S_{tm}\}$ in respect of. In some examples, at least some of the target state generator functions 342(1) to 342(m) are rule-based functions which can be implemented using rules-based algorithms that have been programmed optimally for the specific class or type of behavior that the function will be used to determine candidate target states $S_{tc}=\{S_{t1}, S_{t2}, \ldots, S_{tm}\}$ in respect of. In some examples, the target state generator functions 342(1) to 342(m) can include a mix of rules-based functions and machine learning based functions, with the type of function being the most suitable for determining target states for the specific behavior that the function is configured to process.

This use of behavior-optimized target state generator functions 342(1) to 342(m) allows different methods and considerations to be applied by target state generator 340 in respect of different behavior decisions. By way of example, the level of discretization for grid 404 and kinodynamic parameters that are considered may differ from behavior to behavior. For example, a "keep lane with obstacle avoidance" behavior decision may require finer discretization than an "open area —proceed straight" behavior decision.

The candidate target states $S_{tc}=\{S_{t1}, S_{t2}, \ldots, S_{tm}\}$ output by target state generator 304 are provided in parallel to candidate trajectory generator 350 and target state evaluator 360.

Candidate trajectory generator 350 is configured to determine, based on the estimated vehicle state S, a respective set of candidate state space trajectories $Tc=\{T_1, T_2, \ldots, T_n\}$ that correspond to the set of candidate target end states $S_{tc}=\{S_{t1}, S_{t2}, \ldots, S_{tm}\}$. Each candidate trajectory $T_1, T_2, \ldots, T_n$ defines a respective path through the operating space 402 from the current estimated vehicle state S to a corresponding one of the target states $S_{t1}, S_{t2}, \ldots, S_{tm}$. In some examples, the candidate trajectory generator 350 is implemented using one or more functions. For example, candidate trajectory generator 350 may be implemented using one or more rules-based functions, or one or more machine learning based functions, or combinations of rules-based and machine learning based functions. In some examples, candidate trajectory generator 350 is configured to generate the candidate trajectories $T_1, T_2, \ldots, T_n$ corresponding to respective based on the target states $S_{t1}, S_{t2}, \ldots, S_{tm}$, while honoring other constraints, for example:

avoiding obstacles detected in the space 402; using clothoid or spline forms trajectories that fall within specified constraints for trajectories that require turns; staying within specified constraints for certain kinodynamic parameters (e.g., maximum safe velocity, maximum safe acceleration); and passing through or near intermediate target states $S_{int}$ that are associated with the respective target states $S_{t1}$, $S_{t2}$, ..., $S_{tm}$.

In some examples, candidate trajectory generator 350 is configured to select and retrieve the candidate trajectories $T_1, T_2, \ldots, T_n$ from a corresponding pre-generated set of trajectories that have end states that correspond with the respective target states $S_{t1}, S_{t2}, \ldots, S_{tm}$. In some examples, candidate trajectory generator 350 is configured to generate the candidate trajectories $T_1, T_2, \ldots, T_n$ using one or more pre-defined trajectory generator functions and methods. In this example, the number of candidate trajectories $T_1, T_2, \ldots, T_n$ is the same as the number of candidate target end states $S_{t1}, S_{t2}, \ldots, S_{tm}$. In other examples, there may be a greater number of candidate trajectories than candidate target end states. For example, two different candidate trajectories may be generated (e.g., using different trajectory generator functions) for one candidate target end state.

In at least some examples, similar to target state generator 340, the candidate trajectory generator 350 may include a set of functions, each one of which is optimally configured to determine candidate trajectories for a specific class or type of behavior decision B. By way of example, in the embodiment of FIG. 3, function 352(1) is specifically configured for determining candidate target trajectories for the candidate target states $S_{tc}=\{S_{t1}, S_{t2}, \ldots, S_{tm}\}$ generated in response to the behavior decision input B="keep lane", and function 352(2) is specifically configured for determining candidate target trajectories for the candidate target states $S_{tc}=\{S_{t1}, S_{t2}, \ldots, S_{tm}\}$ generated in response to a behavior decision input B of the "change lane" type. In some examples, the same functions may be used for opposite but symmetrical behaviors—for example, a single "change lane" function is used for both a "change lane-right" or "change lane-left" behavior decision.

The use of behavior-optimized trajectory generator functions 352(1) to 352(m) allows differently learning-based functions, or different rules-based functions, to be used by candidate trajectory generator 350 that correspond to the different behavior decisions. For example, different training data and/or different loss functions may be used for training the different leaning-based functions.

The target state evaluator 360 is configured to process the candidate target end states $S_{tc}=\{S_{t1}, S_{t2}, \ldots, S_{tm}\}$ and the estimated vehicle state S in parallel with the candidate trajectory generator 350 and output information about the suitability of the candidate target end states $S_{tc}=\{S_{t1}, S_{t2}, \ldots, S_{tm}\}$. In some examples, the target state evaluator 360 is configured to apply filtering to remove candidate target end states that are not appropriate and the output suitability information in the form of a sub-set of target end states Sr={Sr1, Sr2, ..., Srk} selected as being suitable from candidate target end states $S_{tc}=\{S_{t1}, S_{t2}, \ldots, S_{tm}\}$ (i.e., k<n). By way of example, some candidate target end states may, based on the estimated state information S, result in a proximity to a curb that is deemed undesirable, in which case those candidate target end states will be filtered out and not included in the subset of target end states Sr={Sr1, Sr2, ..., Srk}.

In some examples, the target state evaluator 360 is configured to rank the candidate target end states $S_{tc}=\{S_{t1}, S_{t2}, \ldots, S_{tm}\}$ from most desirable to least desirable, include the higher ranked candidate target end states in the set of target end states Sr={Sr1, Sr2, ..., Srk}, and omit the lower ranked candidate target end states in the set of target end states Sr={Sr1, Sr2, ..., Srk}. In some examples, ranking information R for the candidate target end states is included in the output of target state evaluator 360 along with or embedded in the set of target end states Sr={Sr1, Sr2, ..., Srk}. In some examples, the output of target state evaluator 360 could include a set of target end states Sr={Sr1, Sr2, ..., Srk} that includes all of the target end states $S_{tc}=\{S_{t1}, S_{t2}, \ldots, S_{tm}\}$ (i.e., k=n), and the ranking information R.

Thus, target state evaluator 360 is configured to output information that distinguishes between more suitable or desirable and less suitable or desirable candidate target end states $S_{tc}=\{S_{t1}, S_{t2}, \ldots, S_{tm}\}$. That distinction can be output in the form of a reduced set of target end states Sr={Sr1, Sr2, ..., Srk}, ranking information R for the candidate target end states, or a combination of both.

In example embodiments, target state evaluator 360 is configured to evaluate the candidate end target states $S_{tc}=\{S_{t1}, S_{t2}, \ldots, S_{tm}\}$ using one or more machine learning techniques or methods, such as a deep learning. Similar to the target state generator 340, in some examples the target state evaluator 360 includes a set of functions 362(1), 362(2) ... 362(m), each one of which is optimally configured to determine candidate end target states that correspond to a specific class or type of behavior B. By way of example, in the embodiment of FIG. 3, function 362(1) is specifically configured for evaluating candidate target states $S_{tc}=\{S_{t1}, S_{t2}, \ldots, S_{tm}\}$ generated in response to the behavior decision input B="keep lane", and function 362(2) is specifically configured for evaluating the candidate target states $S_{tc}=\{S_{t1}, S_{t2}, \ldots, S_{tm}\}$ generated in response to a behavior decision input B of the "change lane" type. In some examples, the same functions may be used for opposite but symmetrical behaviors—for example, a single "change lane" function is used for both a "change lane-right" or "change lane-left" behavior decision.

The use of behavior-optimized target state evaluator functions 362(1) to 362(m) allows different learning-based functions, or different rules-based functions to be used by target state evaluator 360 in respect of candidate target end states that corresponds to the different behavior decisions. By way of example, if the target state evaluator functions 362(1) to 362(m) are learning-based functions, different loss functions may be used to train each of the target state evaluator functions 362(1) to 362(m) to account for the fact that proximity of other objects may require different considerations in for different behaviors. In some alternative examples, the leaning-based functions could be used for different behavior decisions, and each learning-based function may be learned using a neural network with the behavior decision B also being used as an input to the neural network.

In example embodiments, the trajectory selector 370 is configured to receive the set of candidate trajectories Tc={$T_1, T_2, \ldots, T_n$} from candidate trajectory generator 350 along with information about the suitability of selected candidate end target states that correspond to at least some of the candidate trajectories (for example, the filtered and ranked set of target end states Sr={Sr1, Sr2, ..., Srk}) from target state evaluator 360. The trajectory selector 370 is configured to select a final trajectory T from the set of candidate trajectories Tc={$T_1, T_2, \ldots, T_n$} based both on properties of the candidate trajectories Tc={$T_1, T_2, \ldots, T_n$} and the end state suitability information (e.g. Sr={Sr1, Sr2, ..., Srk}, R) received from target state evaluator 360. By way of example a particular trajectory may be selected based on curvature and other kinodynamic parameters associated with the trajectory as well as the relative ranking of the target end state for the trajectory. The selected final trajectory T is output to vehicle control system 140 for implementation. It should be noted the selection of a trajectory is not necessarily limited to evaluation only based on suitability of the candidate target end states. Thus, it is possible that the selected final trajectory T is a trajectory that is generated for a candidate target end state that does not have the highest suitability ranking, for example. As an additional example, the final trajectory can be generated using a weighted-average of a sub-set of the target end states.

In some examples, the trajectory selector generator 370 may be implemented using one or more rules-based functions, or one or more machine learning based functions, or combinations of rules-based and machine learning based functions.

As will be appreciated from the above description, in example embodiments the planning system 130 is configured to enable specific behavior planner decisions (Change Lane, Keep Lane, Stop on Red, Maneuver around Obstacle, etc.) to respectively determine the specific methods used for the corresponding generation and selection of end target states and the generation of candidate state space trajectories. In at least some example's the behavior dependent methods are realized in the form of behavior optimized functions that are learned using machine learning algorithms and sample data as described above. These behavior optimized functions have been specifically trained in respect of specific behaviors. In at least some examples the design of the MoP module 330 enables hierarchical composition with architectural unity. The use of target end states with state space trajectories that correspond to a behavior decision allow the BP module 320 and MoP module 330 to be hierarchically coordinated, which in some embodiments may enable the sub-modules of MoP module 330 (other than target state generator 340) to remain largely agnostic to environment structure variations (such as straight roads, curvy roads, intersections, roundabout, or other undefined road structures).

In some examples, the coordination of BP module 320 and MoP module through a set of candidate subgoals (e.g. target end states) that are appropriate for the behavior decision may enhance the use of machine learning based methods for BP and MoP implementation, and in particular may address a key limitation of conventional planning methods by eliminating or reducing the need for cost estimation according to explicit cost functions that require much hand-tuning and rules-based planning functions that can be very difficult to build and maintain. In example applications, at least some of the sub-modules of the MoP module 330 can be trained and implemented using deep learning, reinforcement learning, and/or other machine learning methods that can enable scalability for complex dynamic scenarios.

A clear correspondence between the BP behavior decisions and the functions of the MoP sub-modules enables each MoP sub-module function to acts as an independent entity or skill and forms a self-contained aspect of the overall navigation capability. Such sub-module functions and their support for the BP behavior decision can be interpreted and evaluated (e.g. for safety) in a modular fashion. In addition, in such a hierarchically modular setting, it is convenient to add more skills or modify and replace them, especially because BP and MoP can be jointly trained through coordinating a new BP decision type with a new MoP sub-module function.

Some specific planning examples will now be described to facilitate an understating of possible applications of the planning system 130 and how behavior-optimized functions may improve system operation. One intended application of the planning system 130 is in multi-lane driving for driving in structured and lane-based scenarios such as highways or urban roads, where change lane and keep lane behaviors are expected to reach to some target goals determined by a mission planner. FIG. 4, referenced above, illustrates an example of driving in an operating space 402 that includes multiple parallel driving lanes L1, L2, L3. Multi-lane driving has the flexibility of being realized through either a) grid-based target end state generation as shown in FIG. 4 or, as b) corridor-based end state generation (described below). In the example of FIG. 4, MoP module 330 includes a change lane function 342(2) that is configured to apply a uniform grid 404 that is in lateral alignment with the road lane structure as reference system for target state generation. The physical positions used for target states can be defined as either a grid point or a grid cell in different use examples. The alignment of lane boundary with grid lines forces the candidate state generation and selection and candidate trajectory generation by the MoP module 330 to honor the behavior decision ("change lane"), illustrating how BP-MoP hierarchy is coordinated.

Figure 5:
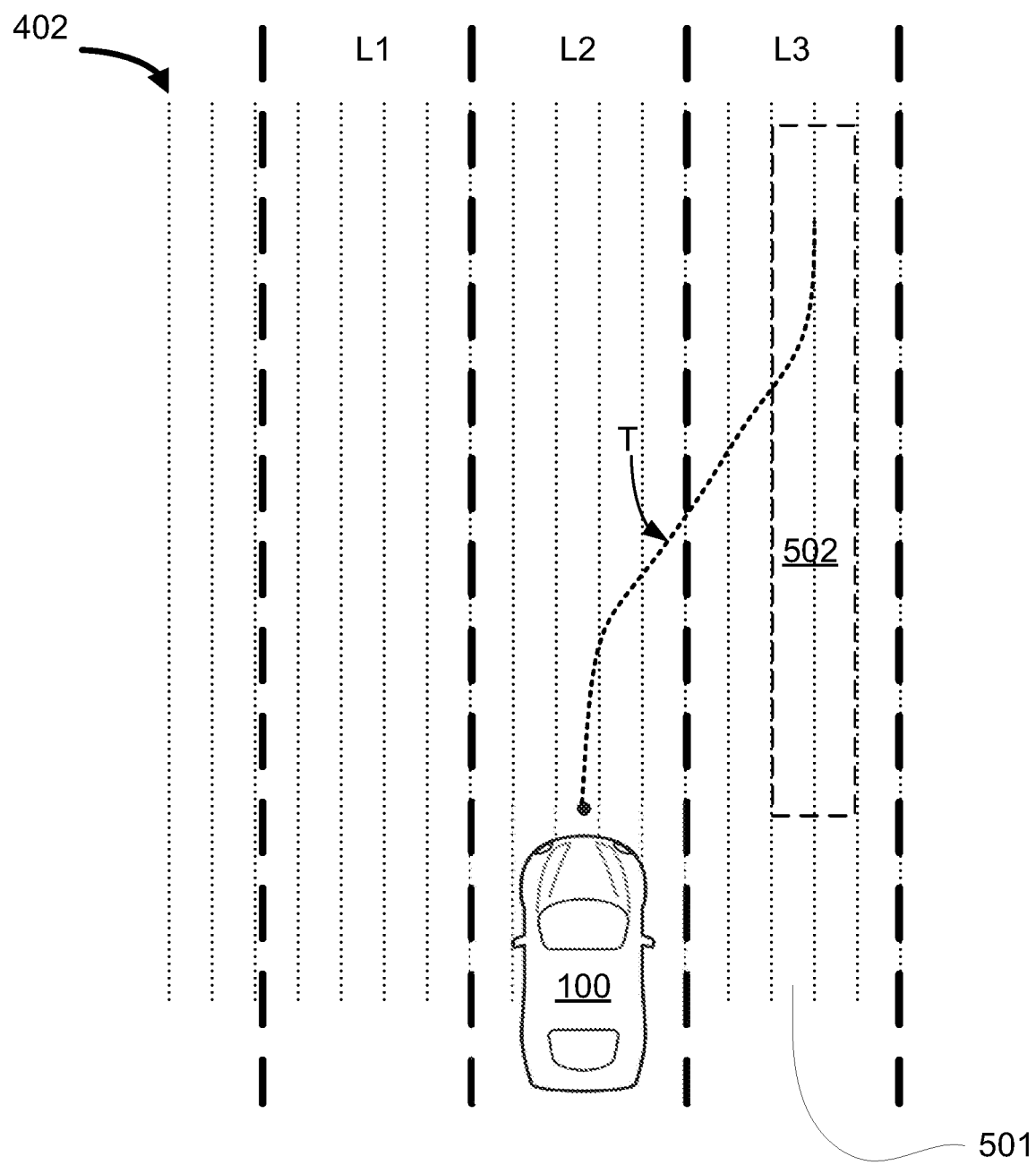
FIG. 5 is a plan view showing a second example of an autonomous vehicle within an operating space, illustrating a change lane behavior using zones.

FIG. 5 illustrates a corridor-based end state generation example. In corridor-based implementation, the requirements over the physical positions specified in target end sates are relaxed for scenarios where flexibility over motion planner trajectories are of less concern. In this realization, the MoP module 330 is responsible to select and navigate into a target corridor, which results in candidate trajectories that are less complex to determine and a final trajectory that is less complex for the control system 140 to execute. The vehicle operations space 402 is discretized into corridors 501 instead of a grid. In the example shown in FIG. 5, the target state generator 340 includes a function 342(i) that is specifically configured to generate candidate target end states in which the position is specified as a range or corridor within a lane. The elongate region 502 represents the corridor selected by target state evaluator 360 of MoP module 330 and the line T is the generated trajectory corresponding to the selected corridor. In this example, the location information in candidate target states designate regions or corridors 501 that are obtained by omitting the horizontal grid lines from the grid 404 shown in FIG. 4. The "grid" simply forms "corridors" of lanes without explicit longitudinal discretization. In example embodiments, reducing the complexity of trajectory generation to grid cell selection or corridor selection can make learning-based functions more implementable. Using behavior-optimized functions to implement the sub-modules of MoP module 330 can allow the complexity of the generated trajectories and the level of discretization used for target end states to be customized for different requirements and scenarios.

Figure 6:
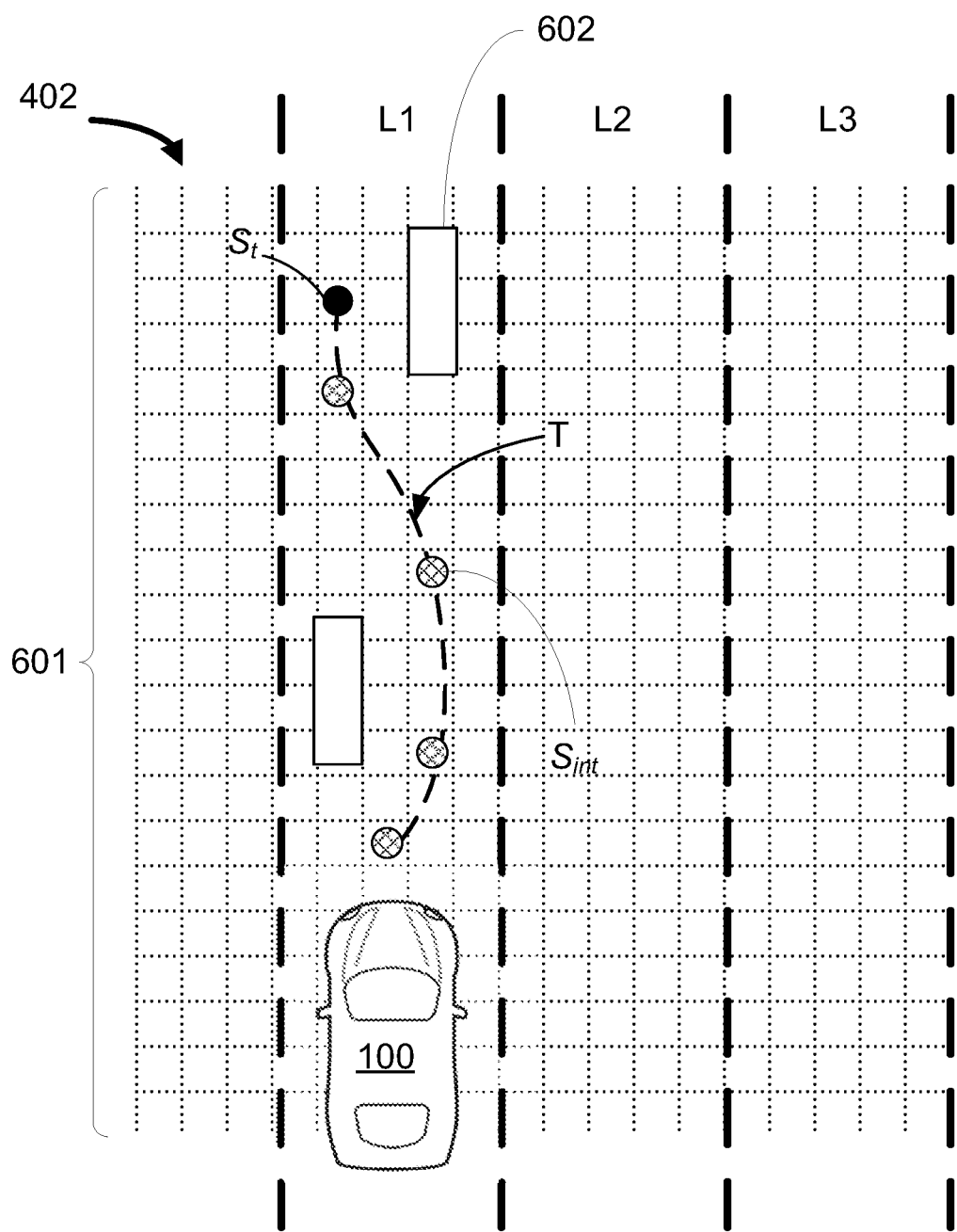
FIG. 6 is a plan view showing a third example of an autonomous vehicle within an operating space, illustrating a keep lane behavior.

FIG. 6 illustrates an example of a behavior decision to "keep lane—maneuver around obstacles" in the context of a car on a multi-lane roadway. In the example of FIG. 6, a trajectory T is generated to maneuver the vehicle 100 around obstacles 602 (e.g., motorcycles). Similar to the example of FIG. 4, the trajectory T is generated for a target end state $S_t$ and there may be one or more intermediate target states $S_{int}$. In the example of FIG. 6, the target state generator 340 and candidate trajectory generator 350 each include a respective functions 342(*j*), 352(*j*) (not shown) that are specifically configured to handle candidate state generation and candidate trajectory generation for the behavior decision B="keep lane—maneuver around obstacles". The functions 342(*j*), 352(*j*) are configured to apply lateral discretization that is more fine-grained than that used by the "change lane" functions 342(2), 352(2) in the example of FIG. 4, taking into account the tighter lateral space that the vehicle must maneuver in. As shown in FIG. 6, the vehicle operational space 402 may be discretized into a grid 601 having finer lateral spacing than the grid 404 of FIG. 4. The longitudinal spacing may be the same as in the example of FIG. 4, or may be different.

The features illustrated in the example of FIG. 6 may provide a more flexible solution compared to existing adaptive cruising systems, and may reduce sudden stops or decelerations for small objects on the road compared to existing adaptive cruising solutions, and can also be used in urban roads, where avoiding parked cars, and over-taking small objects on the lane are inevitable.

Figure 7:
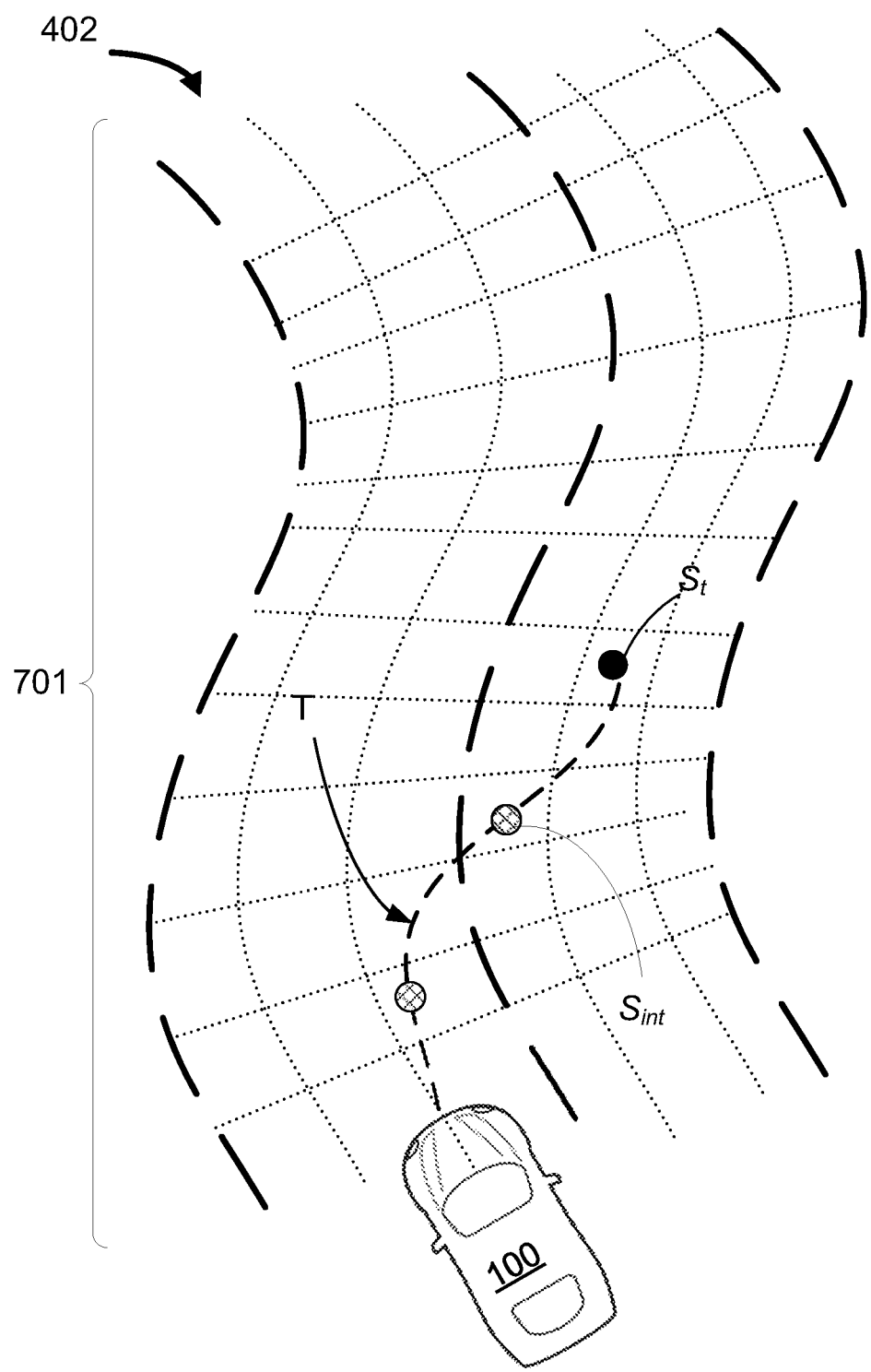
FIG. 7 is a plan view showing a fourth example of an autonomous vehicle within an operating space, illustrating a change lane behavior in a curved road environment.

FIG. 7 illustrates an example of a behavior decision to "change lane—curved road" in the context of a car on a multi-lane curved roadway. Similar to the example of FIG. 4, the trajectory T is generated for a target end state $S_t$ and there may be one or more intermediate target states $S_{int}$. In the example of FIG. 7, the target state generator 340 and candidate trajectory generator 350 each include a respective functions 342(1), 352(1) (not shown) that are specifically configured to handle candidate state generation and candidate trajectory generation for a behavior decision B="change lane—curved road". The functions 342(1), 352(1) are configured to apply a non-uniform discretization of the vehicle operational space 402 for target state and trajectory generation, respectively, as represented by the non-uniform grid 701 in FIG. 7 that conforms to the road layout. The cell variations resulting from the non-uniform discretization inherently consider the constraints to certain kinodynamic parameters (e.g., limits to velocity, acceleration, pose, etc.,) that are introduced by the road curvature relative to a straight road scenario. As a result, the other sub-modules of MoP modules 330 can be configured to handle a more generic "change lane" case, and remain agnostic to variations in lane layout. For example, while the target state generator 340 and candidate trajectory generator 350 each include a respective functions 342(1), 352(1) for a behavior decision B="change lane—curved road", and respective functions 342(2) and 352(2) for B="change lane—straight road", behavior decision, the target state evaluator 360 may just include a more generic function 362(2) "change lane" that can handle target state selection in respect of both the behavior decision B="change lane—curved road" and the B="change lane—straight road" scenarios.

Accordingly, the use of spatiotemporal point selection and generation can allow the functions used for planning steps that follow an initial discretization to be agnostic to any road structure. As a result, from the perspective of these functions, there no fundamental difference between straight roads, curvy roads, intersections, roundabout, or other undefined road structure. This may result in less scenario generation for training as learning-based functions can be trained on a straight road training data and then applied to curved-road applications without additional training or fine tuning. For example, in the example of FIG. 7, the generic function 362(2) "change lane" of target state evaluator 360 may be trained with straight road training examples and then subsequently applied to both straight road and curved road use cases.

Figure 8C:
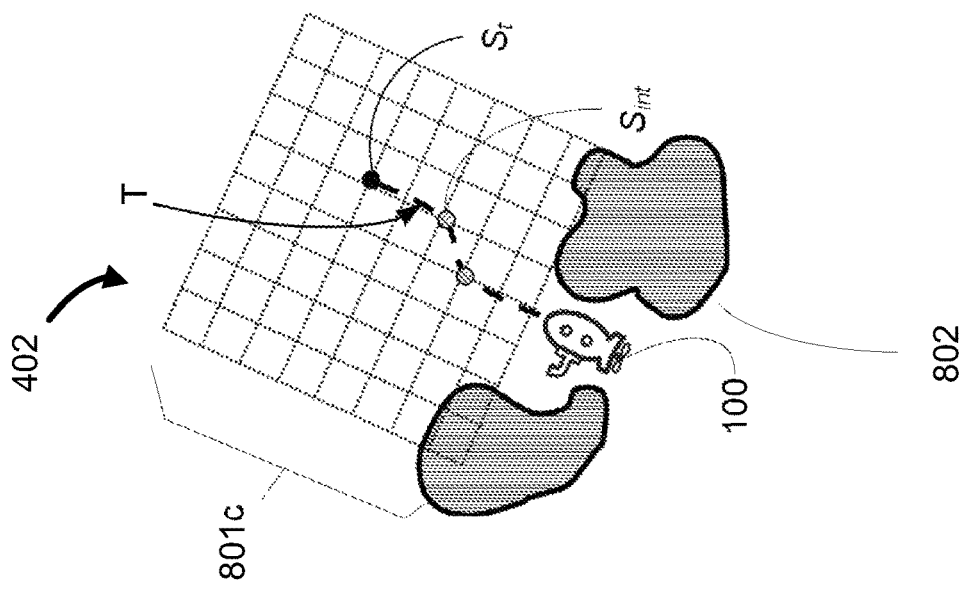
FIGS. 8A-8C are plan views showing a fifth example of an autonomous vehicle within an operating space, illustrating a submarine in accordance with an open area behavior.
Figure 8B:
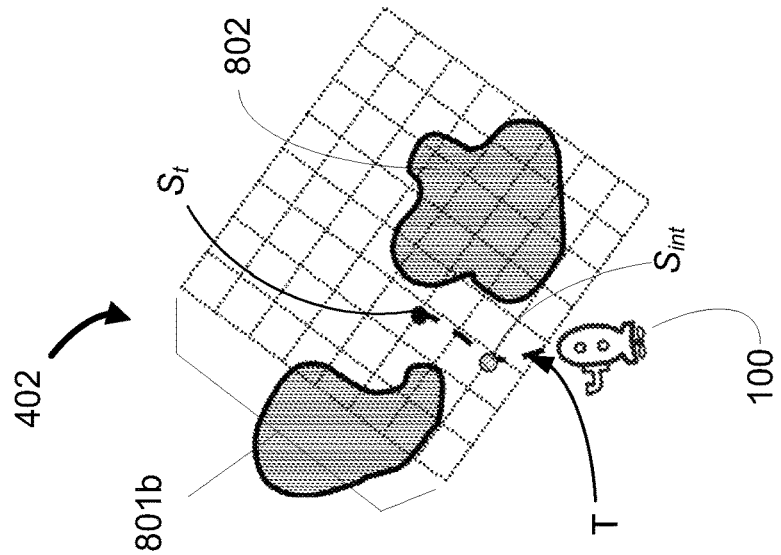
Figure 8A:
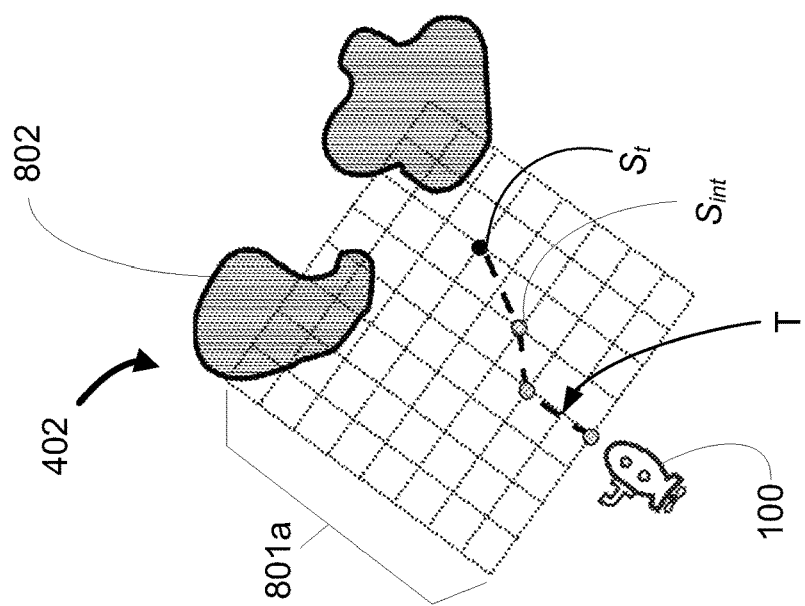

FIGS. 8A-8C illustrates an example of a vehicle in the form of a submarine navigating in an open or unstructured operating space that includes stationary obstacles. In the example of FIGS. 8A-8C, a trajectory T is generated to maneuver the vehicle 100 in an open or unstructured vehicle operating space 402, with obstacles 802. Similar to the example of FIG. 4, the trajectory T is generated for a target end state $S_t$ and there may be one or more intermediate target states $S_{int}$. In the example of FIGS. 8A-8C, MoP module 330 applies a uniform but adequately fine-grained grid 801*a*-801*c* for target state generation and trajectory generation, which is useful for navigation in a largely open area with obstacles to avoid but without explicit lane or road boundary to follow, such as driving in an open field or diving near of the ocean floor. As shown in FIGS. 8A-8C, the grid 801*a*-801*c* is updated as the vehicle 100 navigates the vehicle operating space 402. As the vehicle 100 moves, the target end state $S_t$ and the trajectory T is also updated, as shown in FIGS. 8A-8C. FIGS. 8A-8C represent a capability of handling open area scenarios such as parking lots, unstructured areas, and un-mapped areas. The example of FIGS. 8A-8C does not require prior mapping and prior knowledge of the area. Target state end positions can be dynamically generated without any prior (offline) mapping.

Figure 9:
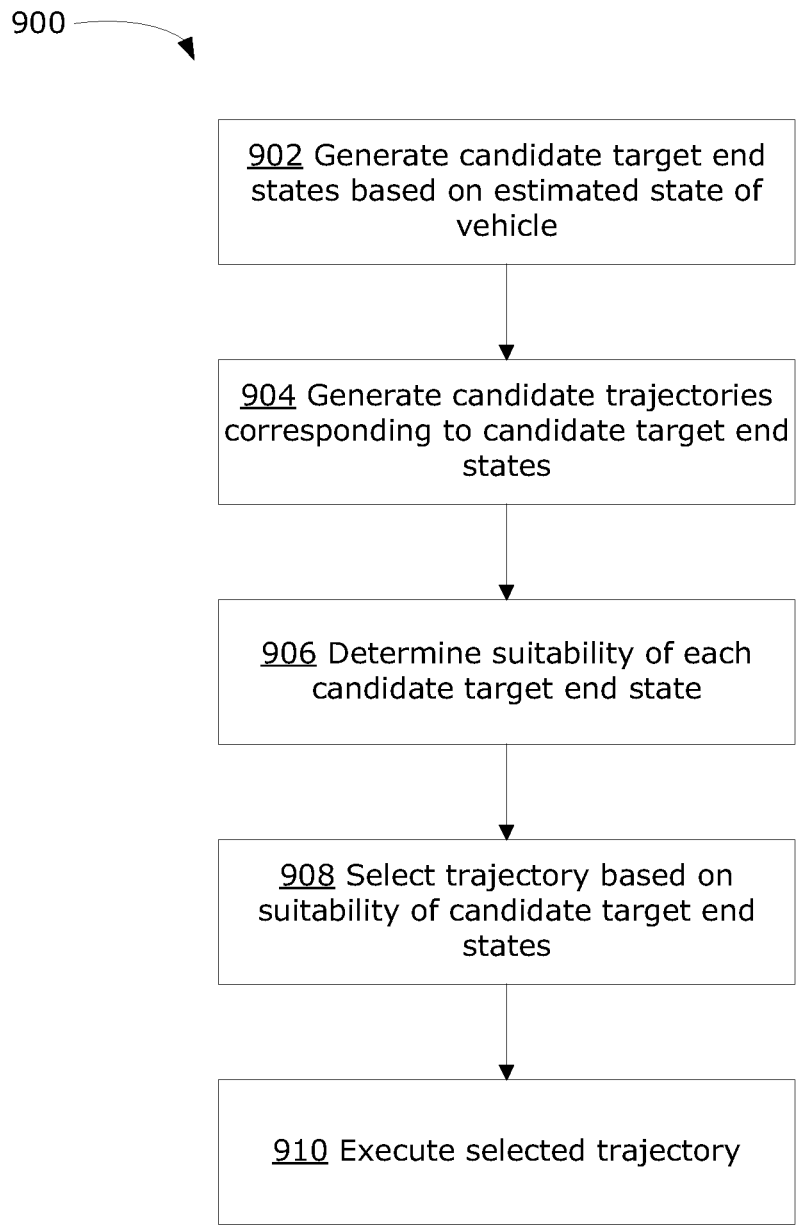
FIG. 9 is a flowchart illustrating an example method for performing hierarchical planning.

FIG. 9 is a flowchart illustrating an example method 900 for performing hierarchical planning, such as described above for an autonomous vehicle. The method 900 may be performed by the planning system 130 of the autonomous vehicle 100, for example. In particular, the method 900 may be performed by the MoP module 330 of the planning system 130.

At action 902, a set of candidate target end states is generated for a behavior decision. The set of candidate target end states includes one or more candidate target end states, and may be generated by the target state generator 340. The behavior decision may be outputted by the BP module 320 of the planning system, and received as input by the MoP module 330. The set of candidate target end states is generated based on an estimated state of the vehicle. The estimated state of the vehicle may include one or more of: information about vehicle position, an environment of the vehicle, or one or more kinodynamic parameters of the vehicle. For example, the state estimation system 120 of the vehicle 100 may provide the estimated state of the vehicle to the planning system 130.

At action 904, a set of candidate trajectories is generated, corresponding to the set of candidate target end states. The set of candidate trajectories includes one or more trajectories, and may be generated by the candidate trajectory generator 350. There may be one candidate trajectory generated for each respective candidate target end state. In some examples, more than one candidate trajectory may be generated (e.g., using two different trajectory generation functions) for a single candidate target end state.

In some examples, it may not be necessary to generate all properties for the trajectories in the set of candidate trajectories. For example, each trajectory may be defined by a set of properties (e.g., including properties defining each intermediate state(s) and end state, where each state may be defined by properties such as vehicle location, vehicle speed, vehicle acceleration and other kinodynamic parameters) it may be sufficient to compute certain properties of the trajectories without completely generating them. For instance, it may be sufficient to use minimal information about the trajectories (e.g., only a subset of the trajectory properties, such as final end location or final speed) and ignore other details. In cases where the trajectories in the set of candidate trajectories are not all fully generated, then when a trajectory is selected for implementation (at action 908 below), the full details of the selected trajectory may be generated after selection.

At action 906, the suitability of each of the candidate target end states is determined. The suitability is determined based on the estimated state of the vehicle. The suitability may be determined by the target state evaluator 360.

At action 908, a trajectory is selected, from the set of candidate trajectories, to implement the behavior decision. The trajectory is selected based on the determined suitability of the candidate target end states. The trajectory may be selected also based on properties of each candidate trajectory. Selection of the trajectory may be performed by the trajectory selector 370.

The selected trajectory may be outputted to control the vehicle 100. For example, the selected trajectory may be provided to the vehicle control system 140, which in turn outputs control signals to the electromechanical system 150, to cause the vehicle 100 to execute the selected trajectory. In some examples, the method 900 may include the action 910 to execute the selected trajectory.

As mentioned above, in some examples, two candidate target end states may have the same location in space but different kinodynamic parameters. This may mean that different candidate trajectories are generated for the two candidate target end states.

In some examples, two different candidate trajectories may be generated for a single candidate target end state. For example, two different trajectory generation methods may be used. In such a case, the number of candidate trajectories in the set of candidate trajectories is different from the number of candidate target end states in the set of candidate target end states. When selecting a trajectory to execute, selecting between the two candidate trajectories may be based on the different properties of the two candidate trajectories.

In some examples, instead of having two different candidate trajectories generated for a single candidate target end state, the candidate target end state may be duplicated so that there are two candidate target end states with the same location and kinodynamic parameters. The two candidate target end states are differentiated by being associated with different trajectory generator functions (e.g., as an additional parameter). In this case, the two different candidate trajectories are each generated for a respective one candidate target end state, and the number of candidate trajectories in the set of candidate trajectories is the same as the number of candidate target end states in the set of candidate target end states.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for determining a trajectory within an operating space for an autonomous vehicle, the method comprising:

at a behaviour planning module of a planning system of the autonomous vehicle, generating a vehicle behaviour decision defining a target type of behaviour for the vehicle, wherein the vehicle behaviour decision is generated based on a target objective for the vehicle defined by a mission planning module of the planning system, and wherein the vehicle behaviour decision is further generated based on an estimated state of the autonomous vehicle, the estimated state of the autonomous vehicle including one or more of: a location of the autonomous vehicle, an environment of the autonomous vehicle, or one or more kinodynamic parameters of the autonomous vehicle;

at a motion planning module of the planning system of the autonomous vehicle:

generating a set of candidate target end states for satisfying the vehicle behaviour decision based on the estimated state of the autonomous vehicle, each candidate target end state defining a state of the autonomous vehicle that satisfies the vehicle behaviour decision, wherein the set of candidate target end states is generated by the motion planning module using one or more target state generation functions that are specific to the vehicle behaviour decision;

determining a suitability of each of the candidate target end states based on the estimated state of the autonomous vehicle;

generating a set of candidate trajectories corresponding to the set of candidate target end states based on the estimated state of the autonomous vehicle; and outputting a selected trajectory for execution by the autonomous vehicle to implement the vehicle behaviour decision, the selected trajectory being selected from the set of candidate trajectories based on the determined suitability of each of the candidate target end states.

2. The method of claim 1, wherein the selected trajectory is further selected based on properties of each of the candidate trajectories.

3. The method of claim 1, wherein generating the set of candidate trajectories comprises generating a subset of trajectory properties for each of the candidate trajectories, and the method further comprises, generating a full set of trajectory properties for the selected trajectory.

4. The method of claim 1, wherein generating the set of candidate trajectories comprises generating at least one candidate trajectory for each of the candidate target end states.

5. The method of claim 4, wherein generating the set of candidate trajectories comprises generating, for at least one candidate target end state, two or more candidate trajectories, wherein the two or more candidate trajectories are generated using different trajectory generator functions.

6. The method of claim 1, wherein the target end state generator function is selected from a plurality of target end state generator functions based on the target type of behaviour for the autonomous vehicle defined by the vehicle behaviour decision.

7. The method of claim 6, wherein the plurality of target end state generator functions include a learning-based function or a rule-based function.

8. The method of claim 6, wherein at least one of the plurality of target end state generator functions is configured to apply a discretization to the operating space of the autonomous vehicle.

9. The method of claim 8, wherein the at least one of the plurality of target end state generator functions is configured to apply a linear grid discretization, a linear region discretization, or a non-uniform grid discretization.

10. The method of claim 1, wherein generating the set of candidate trajectories comprises selecting a trajectory generator function from a plurality of trajectory generator functions based on the target type of behaviour for the autonomous vehicle defined by the vehicle behaviour decision, and using the selected trajectory generator function to generate at least one of the candidate trajectories.

11. A system for determining a trajectory within an operating space for an autonomous vehicle, the system comprising:
  a behaviour planning module configured to generate a vehicle behaviour decision defining a target type of behaviour for the autonomous vehicle, wherein the vehicle behaviour decision is generated based on a target objective for the vehicle defined by a mission planning module of the planning system, and wherein the vehicle behaviour decision is further generated based on an estimated state of the autonomous vehicle, the estimated state of the autonomous vehicle including one or more of: a location of the autonomous vehicle, an environment of the autonomous vehicle, or one or more kinodynamic parameters of the autonomous vehicle; and
  a motion planning module comprising:
    a target state generator configured to generate a set of candidate target end states for satisfying the vehicle behaviour decision based on the estimated state of the autonomous vehicle, each candidate target end state defining a state of the autonomous vehicle that satisfies the vehicle behaviour decision, wherein the set of candidate target end states is generated by the motion planning module using one or more target state generation functions that are specific to the vehicle behaviour decision;
    a target state evaluator configured to determine a suitability of each of the candidate target end states based on the estimated state of the autonomous vehicle;
    a candidate trajectory generator configured to generate a set of candidate trajectories corresponding to the set of candidate target end states based on the estimated state of the autonomous vehicle; and
    a trajectory selector configured to select and output a selected trajectory for execution by the autonomous vehicle to implement the vehicle behaviour decision, the selected trajectory being selected from the set of candidate trajectories based on the determined suitability of each of the candidate target end states.

12. The system of claim 11, wherein the trajectory selector is further configured to select the selected trajectory based on properties of each of the candidate trajectories.

13. The system of claim 11, wherein the candidate trajectory generator is further configured to generate the set of candidate trajectories by generating a subset of trajectory properties for each of the candidate trajectories, and is further configured to generate a full set of trajectory properties for the selected trajectory.

14. The system of claim 11, wherein the candidate trajectory generator is further configured to generate the set of candidate trajectories by generating at least one candidate trajectory for each of the candidate target end states.

15. The system of claim 14, wherein the candidate trajectory generator is further configured to generate the set of candidate trajectories by generating, for at least one candidate target end state, two or more candidate trajectories, wherein the two or more candidate trajectories are generated using different trajectory generator functions.

16. The system of claim 11, wherein the target state generator is further configured to select the target end state generator function from a plurality of target end state generator functions based on the target type of vehicle behaviour for the autonomous vehicle defined by the vehicle behaviour decision.

17. The system of claim 16, wherein at least one of the plurality of target end state generator functions is configured to apply a discretization to the operating space of the autonomous vehicle.

18. The system of claim 17, wherein the at least one of the plurality of target end state generator functions is configured to apply a linear grid discretization, a linear region discretization, or a non-uniform grid discretization.

19. The system of claim 11, wherein the candidate trajectory generator is further configured to generate the set of candidate trajectories by selecting a trajectory generator function from a plurality of trajectory generator functions based on the target type of vehicle behaviour for the autonomous vehicle defined by the behaviour decision, and using the selected trajectory generator function to generate at least one of the candidate trajectories.

20. A non-transitory computer-readable medium storing instructions, which when executed by a processor of an autonomous vehicle, cause the autonomous vehicle to:
  at a behaviour planning module of a planning system of the autonomous vehicle, generate a vehicle behaviour decision defining a target type of behaviour for the autonomous vehicle, wherein the vehicle behaviour decision is generated based on a target objective for the vehicle defined by a mission planning module of the planning system, and wherein the vehicle behaviour decision is further generated based on an estimated state of the autonomous vehicle, the estimated state of the autonomous vehicle including one or more of: a location of the autonomous vehicle, an environment of the autonomous vehicle, or one or more kinodynamic parameters of the autonomous vehicle;

at a motion planning module of the planning system of the autonomous vehicle:

generate a set of candidate target end states for satisfying the vehicle behaviour decision based on the estimated state of the vehicle, each candidate target end state defining a state of the autonomous vehicle that satisfies the vehicle behaviour decision, wherein the set of candidate target end states is generated by the motion planning module using one or more target state generation functions that are specific to the vehicle behaviour decision;

determine a suitability of each of the candidate target end states based on the estimated state of the autonomous vehicle;

generate a set of candidate trajectories corresponding to the set of candidate target end states based on the estimated state of the autonomous vehicle; and output a selected trajectory for execution by the autonomous vehicle to implement the vehicle behaviour decision, the selected trajectory being selected from the set of candidate trajectories based on the determined suitability of each of the candidate target end states.

* * * * *